(12) United States Patent
Merrill

(10) Patent No.: US 6,809,768 B1
(45) Date of Patent: Oct. 26, 2004

(54) DOUBLE SLOPE PIXEL SENSOR AND ARRAY

(75) Inventor: Richard B. Merrill, Woodside, CA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

(21) Appl. No.: 09/494,148

(22) Filed: Feb. 14, 2000

(51) Int. Cl.$^7$ .............................................. H04N 3/14
(52) U.S. Cl. ...................... 348/308; 348/263; 348/267; 257/229
(58) Field of Search ...................... 348/231.99, 231.2, 348/231.3, 231.5, 308, 263, 267; 257/229

(56) References Cited

U.S. PATENT DOCUMENTS

| | | | |
|---|---|---|---|
| 3,866,067 A | 2/1975 | Amelio | 307/311 |
| 3,934,161 A | 1/1976 | Caywood | 307/311 |
| 3,971,065 A | 7/1976 | Bayer | 358/41 |

(List continued on next page.)

FOREIGN PATENT DOCUMENTS

| | | | | |
|---|---|---|---|---|
| DE | 43 04 506 A1 | 8/1994 | .......... | H04N/5/225 |
| DE | 198 36 356 A1 | 5/1999 | .......... | H01L/27/146 |
| EP | 62143571 | 6/1987 | .......... | H04N/5/335 |

(List continued on next page.)

OTHER PUBLICATIONS

Electrically Erasable and Reprogrammable Read–Only Memory Using the n–Channel SIMOS One–Transistor Cell; IEEE Transactions on Electron Devices, vol. ED–24, No. 5, May 1977, Bernward Rossler.

Physics of Semiconductor Devices; Wiley–Interscience; Murray Hill, New Jersey; Bell Telephone Laboratories, Inc., S.M. SZE, 1969.

(List continued on next page.)

*Primary Examiner*—Andrew Christensen
*Assistant Examiner*—Dorothy Wu
(74) *Attorney, Agent, or Firm*—Sierra Patent Group, Ltd.

(57) ABSTRACT

A double-slope MOS active pixel sensor disposed on a semiconductor substrate has a first light-to-output-voltage transfer gain up to a first charge accumulation threshold, has a second light-to-output-voltage transfer gain lower than the first light-to-output-voltage transfer gain above the light accumulation threshold, and comprises first and second photodiodes each having a first terminal coupled to a fixed potential and a second terminal. The second photodiode is smaller than the first photodiode. First and second semiconductor reset switches each have a first terminal coupled respectively to the second terminal of the first and second photodiodes and a second terminal coupled respectively to first and second reset potentials that reverse bias the photodiodes. First and second semiconductor amplifiers each have an input coupled respectively to the second terminals of the first and second photodiodes and have their outputs coupled together. The first and second semiconductor reset switches each have a control element coupled to a control circuit for selectively activating the first and second semiconductor reset switches.

5 Claims, 5 Drawing Sheets

U.S. PATENT DOCUMENTS

| | | | |
|---|---|---|---|
| 4,809,075 A | 2/1989 | Akimoto et al. | 358/213.18 |
| 4,839,735 A | 6/1989 | Kyomasu et al. | 358/213.31 |
| 4,845,553 A | 7/1989 | Konomura et al. | 358/98 |
| 4,875,091 A | 10/1989 | Yamada et al. | 358/42 |
| 4,901,129 A | 2/1990 | Hynecek | 357/30 |
| 4,942,473 A | 7/1990 | Zeevi et al. | 358/213.26 |
| 5,014,107 A | 5/1991 | Vora | 357/44 |
| 5,021,853 A | 6/1991 | Mistry | 357/23.13 |
| 3,988,619 A | 10/1976 | Malaviya et al. | 307/311 |
| 4,011,016 A | 3/1977 | Layne et al. | 356/195 |
| 4,236,760 A | 12/1980 | Haar et al. | 303/6 C |
| 4,238,760 A | 12/1980 | Carr | 357/30 |
| 4,309,604 A | 1/1982 | Yoshikawa et al. | 250/226 |
| 4,363,963 A | 12/1982 | Ando | 250/211 |
| 4,473,836 A | 9/1984 | Chamberlain | 357/30 |
| 4,499,529 A | 2/1985 | Figueroa | 362/283 |
| 4,499,590 A | 2/1985 | Bluzer | 377/60 |
| 4,573,077 A | 2/1986 | Imai | 358/212 |
| 4,613,895 A | 9/1986 | Burkey et al. | 358/41 |
| 4,626,915 A | 12/1986 | Takatsu | 358/213 |
| 4,651,001 A | 3/1987 | Harada et al. | 250/330 |
| 4,654,714 A | 3/1987 | Hurst, Jr. et al. | 358/213 |
| 4,677,289 A | 6/1987 | Nozaki et al. | 250/226 |
| 4,704,633 A | 11/1987 | Matsumoto | 358/213.27 |
| 4,734,776 A | 3/1988 | Wang et al. | 358/213.31 |
| 4,742,238 A | 5/1988 | Sato | 250/578 |
| 4,786,818 A | 11/1988 | Mead et al. | 250/578 |
| 5,038,214 A | 8/1991 | Miida | 358/213.11 |
| 5,055,418 A | 10/1991 | Vora | 437/31 |
| 5,117,292 A | 5/1992 | Matsunaga | 358/213.19 |
| 5,161,024 A | 11/1992 | Oishi | 358/213.24 |
| 5,227,887 A | 7/1993 | Dohi et al. | 358/213.27 |
| 5,241,575 A | 8/1993 | Miyatake et al. | 377/60 |
| 5,276,521 A | 1/1994 | Mori | 358/213.31 |
| 5,289,023 A | 2/1994 | Mead | 257/291 |
| 5,317,174 A | 5/1994 | Hynecek | 257/222 |
| 5,335,015 A | 8/1994 | Cooper et al. | 348/302 |
| 5,341,008 A | 8/1994 | Hynecek | 257/231 |
| 5,355,165 A | 10/1994 | Kosonocky et al. | 348/311 |
| 5,396,289 A | 3/1995 | Nakamura | 348/294 |
| 5,397,734 A | 3/1995 | Iguchi et al. | 437/70 |
| 5,414,464 A | 5/1995 | Sasaki | 348/222 |
| 5,414,465 A | 5/1995 | Kodama et al. | 348/236 |
| 5,414,683 A | 5/1995 | Tani | 36/47 |
| 5,424,223 A | 6/1995 | Hynecek | 437/3 |
| 5,428,390 A | 6/1995 | Cooper et al. | 348/240 |
| 5,434,620 A | 7/1995 | Higuchi et al. | 348/308 |
| 5,461,425 A | 10/1995 | Fowler et al. | 348/294 |
| 5,471,245 A | 11/1995 | Cooper et al. | 348/302 |
| 5,502,299 A | 3/1996 | Standley | 250/208.2 |
| 5,541,402 A | 7/1996 | Ackland et al. | 250/208.1 |
| 5,541,654 A | 7/1996 | Roberts | 348/301 |
| 5,547,881 A | 8/1996 | Wang et al. | 437/24 |
| 5,572,074 A | 11/1996 | Standley | 307/117 |
| 5,576,763 A | 11/1996 | Ackland et al. | 348/303 |
| 5,589,423 A | 12/1996 | White et al. | 437/228 |
| 5,625,210 A | 4/1997 | Lee et al. | 257/292 |
| 5,631,704 A | 5/1997 | Dickinson et al. | 348/308 |
| 5,668,596 A | 9/1997 | Vogel | 348/222 |
| 5,705,441 A | 1/1998 | Wang et al. | 438/384 |
| 5,712,682 A | 1/1998 | Hannah | 348/255 |
| 5,714,753 A * | 2/1998 | Park | 250/208.1 |
| 5,739,562 A | 4/1998 | Ackland et al. | 257/291 |
| 5,742,058 A | 4/1998 | Pantigny et al. | 250/370.08 |
| 5,801,657 A | 9/1998 | Fowler et al. | 341/155 |
| 5,883,421 A | 3/1999 | Ben Chouikha et al. | 257/461 |
| 6,046,444 A | 4/2000 | Afghahi | 250/208.1 |
| 6,078,037 A | 6/2000 | Booth, Jr. | 250/208.1 |
| 6,115,066 A | 9/2000 | Gowda et al. | 348/308 |
| 6,211,510 B1 | 4/2001 | Merrill et al. | 250/208.1 |
| 6,246,436 B1 | 6/2001 | Lin et al. | 348/308 |
| 2003/0038885 A1 * | 2/2003 | Rodriguez | 348/222.1 |

FOREIGN PATENT DOCUMENTS

| | | | |
|---|---|---|---|
| EP | 01103378 | 4/1989 | H04N/5/335 |
| EP | 0 466 929 A1 | 1/1992 | H04N/5/238 |
| EP | 06133320 | 5/1994 | H04N/9/09 |
| EP | 0 605 898 A1 | 7/1994 | H01L/27/146 |
| EP | 08009391 | 1/1996 | H04N/9/04 |
| EP | 0707416 A2 | 4/1996 | H04N/3/15 |
| EP | 08095670 | 4/1996 | G06F/1/16 |
| EP | 09128091 | 5/1997 | G06F/1/00 |
| EP | 0 777 379 A1 | 6/1997 | H04N/3/15 |
| EP | 0 854 516 A2 | 7/1998 | H01L/27/146 |
| JP | 54-108628 | 8/1979 | G03B/7/20 |
| JP | 58-83824 | 5/1983 | G03B/7/20 |
| JP | 59-42527 | 3/1984 | G03B/17/14 |
| JP | 59-152424 | 8/1984 | G03B/7/20 |
| JP | 60-23841 | 2/1985 | G03B/17/14 |
| JP | 60-53912 | 3/1985 | G02B/7/11 |
| WO | WO 96/15626 | 5/1996 | H04N/5/335 |
| WO | WO 97/17800 | 5/1997 | H04N/3/143 |
| WO | WO 98/19455 | 5/1998 | H04N/3/15 |
| WO | WO 99/66560 | 12/1999 | H01L/27/144 |
| WO | WO 99/66712 | 12/1999 | H04N/3/15 |
| WO | WO 00/72604 A1 | 11/2000 | H04N/9/04 |

OTHER PUBLICATIONS

Abbas El Gamal, et al. "Modeling and Estimation of FPN Components in CMOS Image Sensors", Information Systems Laboratory, Stanford University, and Fudan University, Shanghai, China, pp. 1–10, (sometime after Jan. 1998).

Albert J. P. Theuwissen, "Solid–State Imaging with Charge–Coupled Devices", Kluwer Academic Publishers, 1997, Chapter 5, pp. 131–141.

Alex Dickinson, et al., "TP 13.5 : A 256×256 CMOS Active Pixel Image Sensor With Motion Detection", IEEE International Solid–State Circuits Conference, 1995, pp. 226–227.

Andrew J. Blanksby, et al. "Noise Performance of a Color CMOS Photogate Image Sensor", IEEE, IEDM, 1997, pp. 202–204.

Bob Weibel, "High–End Digital Cameras Can Make Professional Indoor Photography A Snap", Buyer's Guide, Published Apr. 1997, pp. 71–78.

Carver A. Mead, et al. "Scanners For Visualizing Activity of Analog VLSI Circuitry", California Institute of Technology Computation and Neural Systems Program, Jul. 5, 1991, pp. 2–29.

Chye Huat Aw, et al."A 128×128–Pixel Standard–CMOS Image Sensor With Electronic Shutter", IEEE International Solid–State Circuits Conference, 1996, pp. 4–39 to 4–40.

Don Sutherland, "Neaveau Niche–Part I, The Latest in Digital SLRs", Shutterbug, Nov. 1997, pp. 192, 193, 202, 208 & 210.

D. Knipp, et al. "Low Cost Approach to Realize Novel Detectors For Color Recognition", Forschungszentrum Julich GmbH, ISI–PV, (year unknown), pp. 350–353.

Eric R. Fossum, "Active Pixel Sensors: Are CCD's Dinosaurs?", SPIE vol. 1900, Jul. 1993, pp. 2–14.

Guang Yang, et al. "A Snap–Shot CMOS Active Pixel Imager For Low–Noise, High–Speed Imaging", IEEE, 1998, pp. 45–48.

Hon–Sum Philip Wong, "CMOS Image Sensors–Recent Advances and Device Scaling Considerations", IEDM, 1997 IEE, pp. 201–204.

Hon–Sum Philip Wong, et al. "*CMOS Active Pixel Image Sensors Fabricated Using a 1.8–V, 0.25–µm CMOS Technology*", IEEE Apr., 1998, pp. 889–894.

Hon–Sum Wong, et al. "*Technology and Device Scaling Considerations for CMOS Imagers*", IEEE Transactions on Electron Devices, vol. 43 No. 12, Dec. 1996, pp. 2131–2142.

Ken Parulski, et al. "*Enabling Technologies for a Family of Digital Cameras*", Eastman Kodak Company, SPIE vol. 2654, 1996, Invited Paper, pp. 156–163.

Mohamed Ben Chouikha, et al. "*Buried Triple p–n Junction Structure in a BiCMOS Technology for Color Detection*", IEEE BCTM 6.4, Sep. 1997 pp. 108–111.

Mohamed Ben Chouikha, et al. *Color Sensitive Photodetectors in Standard CMOS and BiCMOS Technologies*, SPIE vol. 2950, 1996, pp. 108–120.

Orly Yadid–Pecht, et al. "*A Random Access Photodiode Array for Intelligent Image Capture*", IEEE Transations on Electron Devices, vol. 38, No. 8, Aug. 1991, pp. 1772–1780.

R. Daniel McGrath, et al. "*FA 11.2: Current–Mediated, Current–Reset 768×512 Active Pixel Sensor Array*", IEEE Digest of Technical Papers, Feb. 7, 1997, pp 182–183, 138–139.

R.M. Guidash, et al. "*A 0.6µm CMOS Pinned Photodiode Color Imager Technology*", IEDM, 1997, pp 927–929.

R. Panicacci, "*¼ Inch CMOS Active Pixel Sensor With Smart On–Chip Functions and Full Digital Interface, Part 1., Brief Introduction to CMOS Image Sensors*", Hot Chips IX, Aug. 25–26, 1997, pp. 41–53.

Savvas G. Chamberlain, "*Photosensitivity and Scanning of Silicon Image Detector Arrays*", IEEE Journal of Solid–State Circuits, vol. SC–4, No. 6, Dec. 1969, pp. 333–342.

Stephen John Decker, "*A Wide Dynamic Range CMOS Imager with Parallel On–Chip Analog–to Digital Conversion*", Sumitted to the Department of Electrical Engineering and Computer Science at Massachusetts Institute of Technology, Sep. 1997, pp. 3–205.

Sunetra K. Mendis, et al. "*A 128×128 CMOS Active Pixel Image Sensor for Highly Integrated Imaging Systems*", IEEE, 1993, pp. 583–586.

T. Delbruck et al, "*Analog VLSI Phototransduction by Continuous–time, Adaptive, Logarithmic Photoreceptor Circuits*", California Institute of Technology Computation and Neural Systems Program, CNS Memo No. 30, Apr. 2, 1996, pp. 24.

Tobi Delbruck, et al."*Analog VLSI Adaptive, Logarithmic, Wide–Dynamic–Range Photoreceptor*", IEEE, May 1994, pp. 4 pages.

Tatsuo Nomoto, et al. "*FA 11.4: A 4M–Pixel CMD Image Sensor With Block and Skip Access Capability*", IEEE International Solid–State Circuits Conference, 1997, 6 pages.

Hiroki Miura, et al., "*A 100 Frame/s CMOS Active Pixel Sensor For 3D–Gesture Recognition System*", IEEE International Solid–State Circuits Conference, Jun. 1999, pp. 142–143.

Yoshiaki Hagiwara, "*High–Density and High–Quality Frame Transfer CCD Imager With Very Low Smear, Low Dark Current, and Very High Blue Sensitivity*", IEEE Transactions on Electron Devices, vol. 43, No. 12, Dec. 1996, pp. 2122–2130.

D. Renshaw, et al., "*ASIC Image Sensors*", IEEE, 1990, pp. 3038–3041.

Peter B. Denyer, et al., "*On–Chip CMOS Sensors For VLSI Imaging Systems*", VLSI 91, Proceedings of the IFIP TC 10/WG 10.5 International Conference on Very Large Scale Integration, Aug. 1991, pp. 4b.1.1 to 4b.2.1.

J.E.D. Hurwitz, et al. "*An 800K–Pixel Color CMOS Sensor For Consumer Still Cameras*", SPIE vol. 3019, 1997, pp. 115–124.

Rudolph H. Dyck et al., "*Integrated Arrays of Silicon Photodetectors For Image Sensing*", IEEE Transactions on Electron Devices, vol. ED–15, No. 4, Apr. 1968, pp. 196–201.

Peter J. W. Noble, "*Self–Scanned Silicon Image Detector Arrays*", IEEE Transactions on Electron Devices, vol. ED–15, No. 4, Apr. 1968, pp. 202–208.

G. Sadasiv, et al., "*Thin–Film Circuits For Scanning Image–Sensor Array*", IEEE Transactions on Electron Devices, vol. ED–15, No. 4, Apr. 1968, pp. 215–219.

Thierry M. Bernard, "*Advanced Focal Plane Arrays and Electronic Cameras*", Proceedings EurOpt Series, vol. 2950, Oct. 1996, pp. 111–120.

S. Decker et al, "*A 256×256 CMOS Imaging Array With Wide Dynamic Range Pixels and Column–Parallel Digital Output*", IEEE International Solid–State Circuits Conf., 1998, pp. 176–177.

\* cited by examiner

DOUBLE SLOPE PIXEL SENSOR AND ARRAY

BACKGROUND OF THE INVENTION

1. Field of the Invention

The present invention relates to MOS active pixel sensors. More particularly, the present invention relates to a MOS active pixel sensor having a double slope light-to-output-voltage transfer gain characteristic.

2. The Prior Art

Integrated image sensors are known in the art. Such sensors have been fabricated from charge-coupled devices (CCDs) and as bipolar and MOS image sensors.

CMOS image sensors and image sensor circuitry may be organized in a manner similar to that which is disclosed in co-pending application Ser. No. 08/969,383, filed Nov. 13, 1997. Individual pixel sensors may be designed in a number of different ways. One possible pixel sensor design comprises a photodiode having its anode connected to a fixed voltage potential such as ground. The cathode of the photodiode is connectable to an amplifier. The cathode of the photodiode is also connectable to a reference potential via a reset switch so that the photodiode is reverse biased. The output of the amplifier is attached to a row-select switch, which is connected to a row select line and a column line.

The pixel sensor is first reset by turning on the reset switch. Then the reset switch is then turned off so that integration of photocurrent from the photodiode can begin. The current from the photodiode is integrated on the amplifier input node capacitance to form a voltage signal. At the appropriate time, the voltage on the row select line is raised, which activates the row-select switches in each pixel sensor in the row. This allows the amplifier to drive column line. The column line then leads down to more circuitry that will typically amplify and store the signal, and then convert the signal into digital form for inclusion in a digital pixel stream.

One problem encountered with prior-art imagers is a limitation on the dynamic range of images that can be captured by the array. Images that contain both low-light-level pixels and high-light-level pixels could be improved if the dynamic range of the imager could be increased.

In an active pixel sensor, the sensitivity of measuring charges generated by photons can be described as a charge-to-voltage gain or light-to-output-voltage transfer gain. Typically, in a prior art active pixel sensor, this gain is accounted for by two factors. A first factor is the reciprocal of the capacitance of the charge accumulation node in the sensor where photocharge accumulates to change a potential (a reciprocal capacitance represents units of volts per coulomb). A second factor is the gain of the readout amplifier, typically less than one using a source follower. Voltage dependence of the photodiode capacitance and other capacitances, and nonlinearities of the readout amplifier transistor can make the gain vary with level, so that the overall transfer curve may be somewhat nonlinear. A nonlinearity in which higher light intensities give lower gains is said to be compressive. A significant degree of compressive nonlinearity can have a beneficial effect on the signal-to-noise ratio of the image at low light levels, and can thereby enhance the usable dynamic range of the imager.

It is therefore an object of the present invention to provide a pixel sensor and an array of pixel sensors that overcome some of the shortcomings of the prior art.

A further object of the present invention is to provide a pixel sensor and an imaging array of pixel sensors that includes image level compression.

BRIEF DESCRIPTION OF THE INVENTION

According to the present invention, a pixel sensor having built-in compression is disclosed. The pixel sensor of the present invention has a first light-to-output-voltage transfer gain up to a light accumulation threshold, and a second light-to-output-voltage transfer gain lower than the first light-to-output-voltage transfer gain after the light accumulation threshold. The pixel sensor of the present invention may be referred to herein as a double-slope active pixel sensor and has a larger dynamic range than pixel sensors without this feature.

A double-slope MOS active pixel sensor disposed on a semiconductor substrate comprises a first photodiode having a first terminal connected to a fixed potential and a second terminal. A second photodiode smaller than the first photodiode has a first terminal connected to a fixed potential and a second terminal. The first terminals of the first and second photodiodes are usually, but not necessarily, connected to the same potential such as ground.

A first semiconductor reset switch has a first terminal connected to the second terminal of the first photodiode and a second terminal connected to a first reset potential that reverse biases the first photodiode. A second semiconductor reset switch has a first terminal connected to the second terminal of the second photodiode and a second terminal connected to a second reset potential that reverse biases the second photodiode.

A first semiconductor amplifier has an input connected to the second terminal of the first photodiode and an output. A second semiconductor amplifier has an input connected to the second terminal of the second photodiode and an output. The outputs are coupled through one or two row-select switches to an output column line.

The first and second semiconductor reset switches each have a control element connected to a control circuit for selectively activating the first and second semiconductor reset switches.

In operation, the pixel sensor is first reset: the potentials at the second terminals of the first and second photodiodes are reset to the first and second reset potentials. The reset switches are then turned off, by taking their gates to a potential that establishes overflow potential barriers in their channels. Initially, high-gain conversion of integrated photocharge takes place. Later, integration of charge from the smaller photodiode dominates the pixel sensor output signal when the voltage of the second photodiode exceeds the voltage on the first photodiode. The two different light-to-voltage conversion gains, or slopes, give the pixel sensor a beneficial compressive characteristic.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure. For example, the illustrative embodiments of the present invention are disclosed using all N-Channel MOS transistor switches, but other technologies could be employed as well.

Figure 1A:
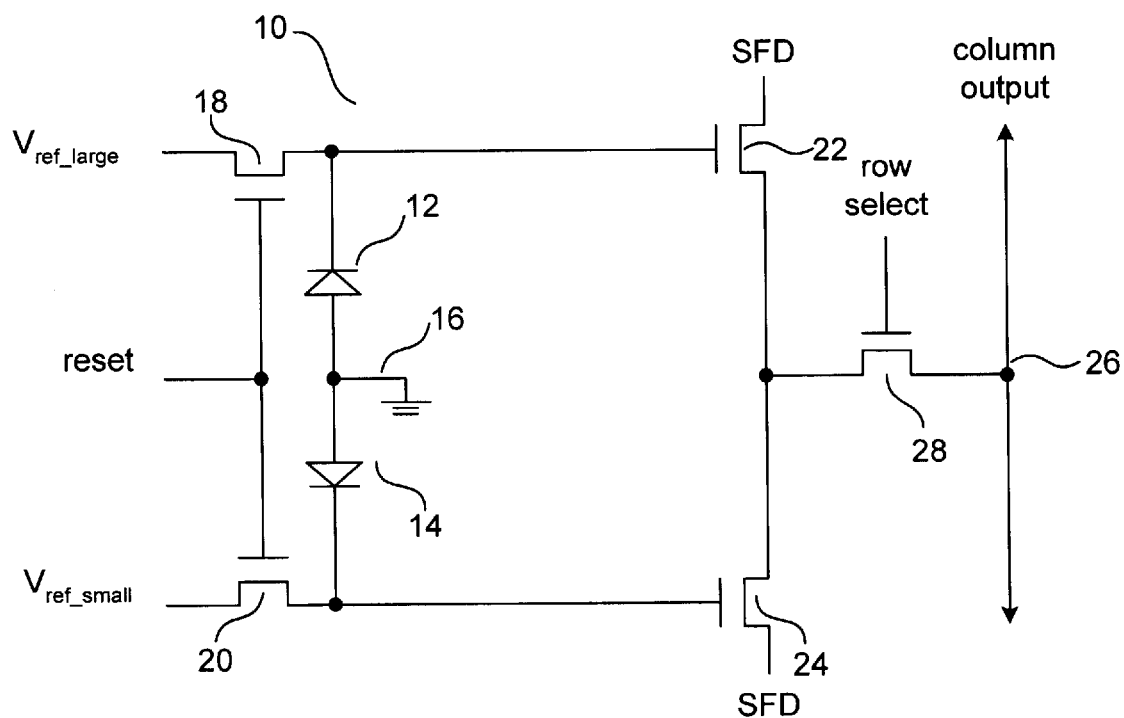
FIG. 1A is a schematic diagram of a double-slope MOS active pixel sensor according to one embodiment of the present invention.

Referring first to FIG. 1A, a schematic diagram of an illustrative embodiment of a double-slope MOS active pixel sensor 10 according to the present invention is shown. First and second photodiodes 12 and 14, respectively, are shown having their anodes connected to ground potential at reference numeral 16. Photodiode 12 is larger than photodiode 14. Typically, photodiode 12 may be about 10 square microns and photodiode 14 may be less than one square micron.

The cathode of photodiode 12 is connected to the source of N-Channel MOS Reset transistor 18 and the cathode of photodiode 14 is connected to the source of N-Channel MOS Reset transistor 20. The drain of N-Channel MOS Reset transistor 18 is connected to a first Reset potential Vref Large having a potential on the order of about +3 volts. The drain of N-Channel MOS Reset transistor 20 is connected to a second Reset potential Vref Small having a potential on the order of about +1.5 volts. The gates of N-Channel MOS Reset transistors 18 and 20 are connected to a source of a RESET signal having an active high level of about 3 volts and an inactive low level of about +0.5 volts. All voltages are referred to ground, which is typically the potential of the substrate.

N-Channel MOS source-follower amplifier transistor 22 has its gate connected to the cathode of photodiode 12, and its drain connected to a pulsed or constant supply voltage SFD. N-Channel MOS source-follower amplifier transistor 24 has its gate connected to the cathode of photodiode 14, and its drain connected to a pulsed or constant supply voltage SFD. The SFD voltage is typically near +0.1 volts during reset and at +3 volts at the end of integration and during readout, or may be held at a constant +2 to +3 volts.

The sources of both N-Channel MOS source-follower amplifier transistors 22 and 24 are coupled to COLUMN OUTPUT line 26 through N-Channel MOS Row-select transistor 28. The gate of N-Channel MOS Row-select transistor 28 is driven by a source of a ROW SELECT signal having an active high level of about 3 volts and an inactive low level of about zero volts. COLUMN OUTPUT line 26 is one of the column output lines in an array of pixels of the present invention. Persons of ordinary skill in the art will appreciate that, in such an array, a row of pixel data selected by assertion of a row select line will be presented on column output lines of the array as known in the art.

Persons of ordinary skill in the art will also understand that, as the geometries of the devices in the double-slope MOS active pixel sensor 10 of the present invention are scaled down, the voltage potentials of the various reference voltages and signal voltages will also be scaled down.

Figure 1B:
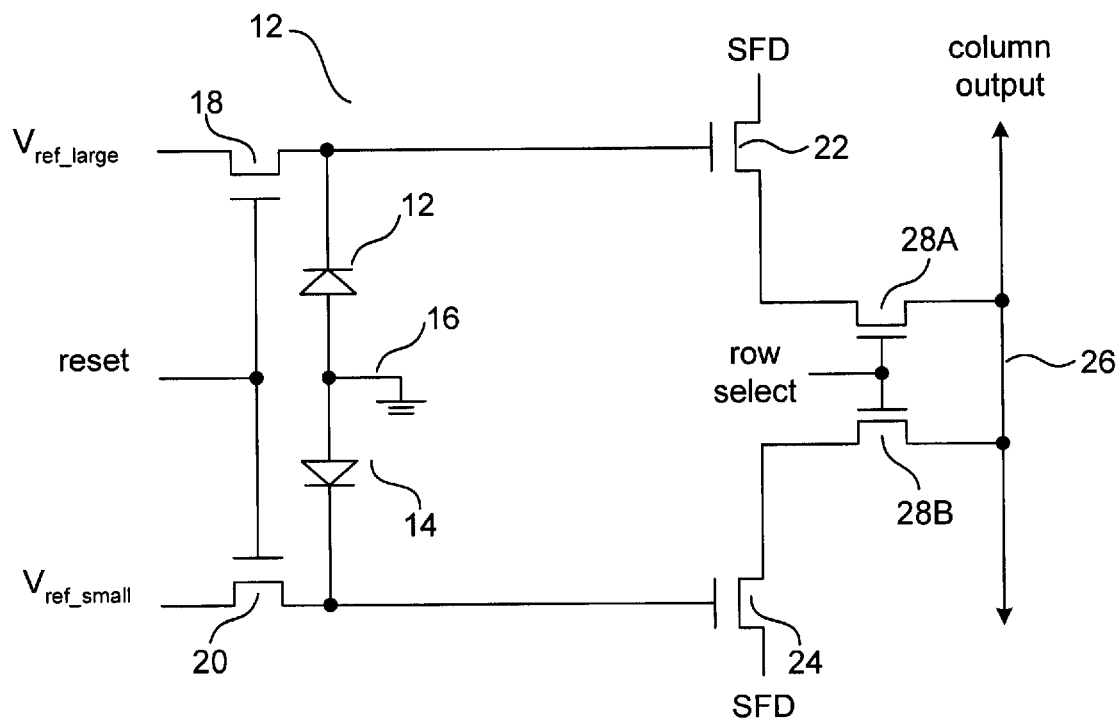
FIG. 1B is a schematic diagram of a double-slope MOS active pixel sensor according to one alternate embodiment of the present invention.

Referring now to FIG. 1B, a schematic diagram of a double-slope MOS active pixel sensor according to one alternate embodiment of the present invention is shown. The double-slope MOS active pixel sensor of FIG. 1B is similar in most respects to the double-slope MOS active pixel sensor of FIG. 1A and the corresponding circuit elements of FIGS. 1A and 1B will be identified by like reference numerals. The difference between the embodiments of FIGS. 1A and 1B is that individual N-Channel MOS Row-select transistors 28A and 28B are employed to couple the sources of N-Channel MOS source follower transistors 22 and 24, respectively, to column select line 26. The circuit of FIG. 1B operates in all respects identically to the circuit of FIG. 1A.

The photodiodes of the double-slope MOS active pixel sensor of both FIGS. 1A and 1B are reset to Vref Large and Vref Small. The N-Channel MOS Reset transistors 18 and 20 are both turned on at this time.

When RESET is asserted, the Vref Large reference voltage is placed on the cathode of large photodiode 12 and the lower Vref Small reference voltage is placed on the cathode of small photodiode 14.

The RESET signal level is reduced to an overflow barrier level of about +0.5 volts. This action turns off N-Channel MOS Reset transistors 18 and 20. The cathode of photodiode 12 and gate of source follower transistor 22 are capacitively held near Vref Large and the cathode of photodiode 14 and gate of source follower transistor 24 are capacitively held near Vref Small.

Figure 2:
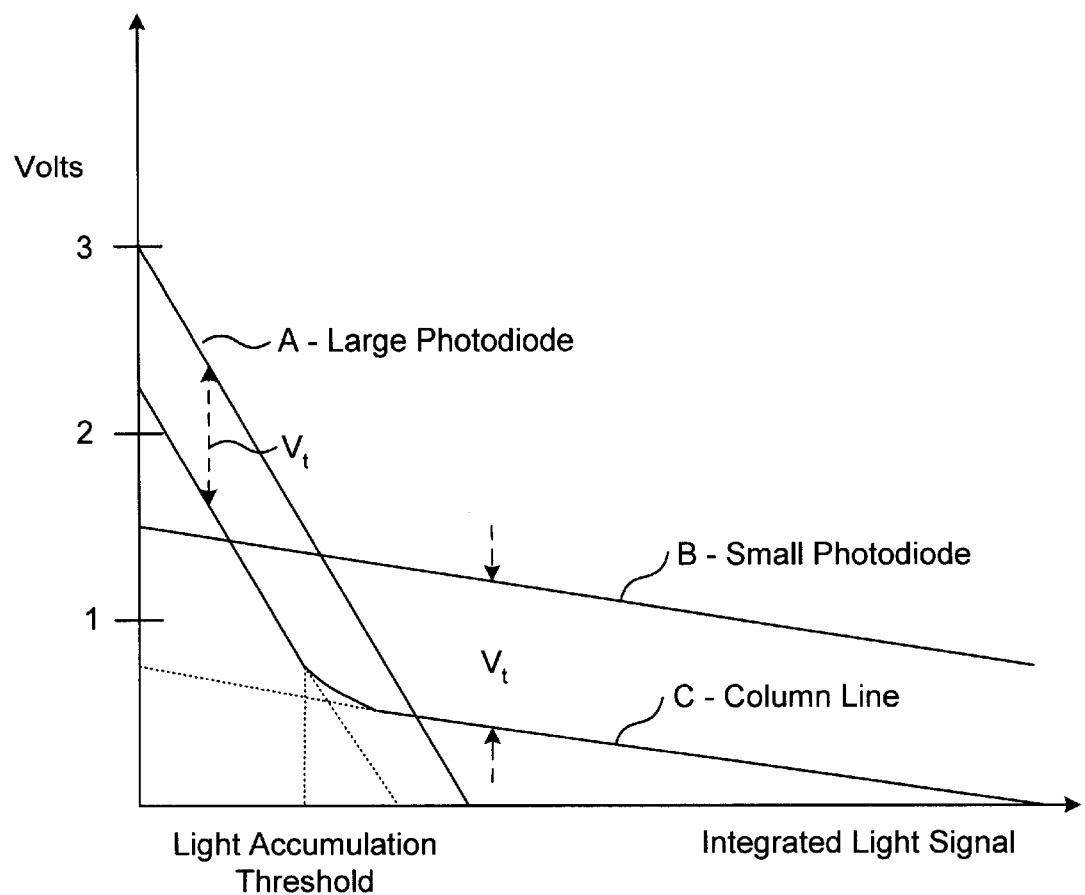
FIG. 2 is a plot of output voltage as a function of integrated light signal for the double-slope MOS active pixel sensor of FIGS. 1A and 1B.

Under these conditions, integration of photocharge begins. Charge from the cathode of large photodiode 12 accumulates at the gate terminal of N-Channel MOS source-follower transistor 22 and charge from the cathode of small photodiode 14 accumulates at the gate terminal of N-Channel MOS source-follower transistor 24. The rate of voltage change at the output column line or the common source node of source-follower transistors 22 and 24 of a sensor in a selected row as a function of accumulated light during this period is shown in the transfer curve of FIG. 2 as the steeply sloped line "A" beginning at about 3 volts on the Y axis. Typically, this voltage is only realized after the end of integration, during a readout phase, when the row-select transistor is turned on. The initial steep portion of line "C" represents the pixel sensor output voltage on the column line that follows below line "A" at a difference of a transistor threshold voltage.

Figure 3:
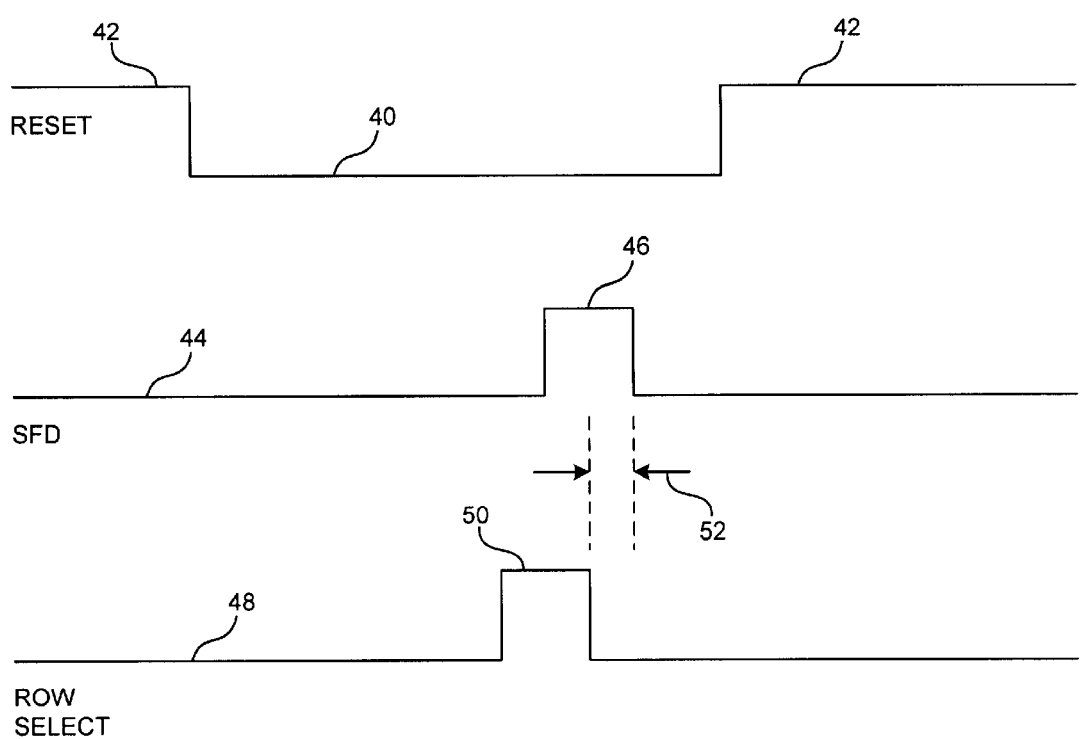
FIG. 3 is a timing diagram showing the timing and levels of the signals used to drive an array of double-slope MOS active pixel sensors according to the present invention.

All during the charge integration period, accumulating charge has been integrating on the charge sharing parallel combination of the cathode of small photodiode 14 and the the gate of N-Channel MOS source-follower transistor 24. Because the area of photodiode 14 is small compared to the area of photodiode 12, the rate of accumulation of charge on the cathode of small photodiode 14 is slower than the rate of charge accumulation on the cathode of large photodiode 12 as may be seen by comparing the slopes of lines "A" and "B" of FIG. 2. In the embodiment of FIG. 1A the sources of source follower transistors 22 and 24 are connected together to form the pixel output. In the embodiment of FIG. 1B the sources of source follower transistors 22 and 24 are connected together through select transistors 28A and 28B during readout to form the sensor output. In either case, the voltage at the sensor output when the row is selected by an active level on Row Select will be established by the one of the two N-Channel MOS source-follower transistors that has the highest (most positive) gate voltage. Initially, the voltage at the gate of N-Channel MOS source-follower transistor 22 will be higher than the voltage at the gate of N-Channel MOS source-follower transistor 24 because of the relative values of Vref Large and Vref Small. Therefore, the voltage at the node comprising the common sources of N-Channel MOS source follower transistors 22 and 24 will be established by N-Channel MOS source follower transistor 22. When the potential on the gate of N-Channel MOS source follower transistor 22 drops below that of N-Channel MOS source follower transistor 24, the more positive voltage at the gate of N-Channel MOS source follower transistor 24 will establish the output voltage of the pixel. Because this voltage is dropping more slowly than that on the gate of N-Channel MOS source follower transistor 22, the rate at which the circuit voltage continues to drop will decrease. The rate of voltage change at the sensor output as a function of accumulated light during this period is shown in FIG. 3 as the less steeply sloped line "B" beginning at below about 1.5 volt on the Y axis. The second portion of line "C" represents the voltage on the column line that follows below line "B" at a difference of a transistor threshold voltage. Persons of ordinary skill in the art will recognize that the individual slopes of lines "A" and "B" in FIG. 2 will be determined by the sizes of photodiodes 12 and 14 and capacitance values of the circuit. The intersection between the lines "A" and "B", or the break point in the curve "C", corresponds to a threshold amount of accumulated light at which the response changes from high gain to low gain.

The decreasing voltage at the cathode of the large photodiode 12 and the gate of the N-Channel MOS source-follower transistor 22 caused by the accumulating photocharge drops below an overflow barrier set by the gate voltage on the N-Channel MOS Reset transistor 18. At this point, any further charge that accumulates at the cathode of large photodiode 12 overflows into the Vref Large potential, to which the voltage at the cathode of the large photodiode 12 becomes clamped. Similarly, the small photodiode may eventually overflow into Vref Small. These overflow paths prevent blooming, wherein overexposed areas might otherwise overflow into neighboring pixels.

The ROW SELECT signal at the gate of MOS Row-select transistor 28 of FIG. 1A and 28A and 28B of FIG. 1B may be asserted high at any time after the exposure is terminated by a shutter, or at the end time to effectively end the exposure for that row. The SFD voltage must be brought to its high state to enable output; bootstrap amplification of the signal voltage on the gate of N-Channel MOS source-follower transistor 24 will result, as disclosed in co-pending application Ser. No. 09/099,116, filed Jun. 17, 1998. During a readout phase, SFD may be held high, or as disclosed in co-pending application Ser. No. 09/099,111, filed Jun. 17, 1998, they may be pulsed high only during a brief charging interval for each row, and low otherwise.

Figure 5:
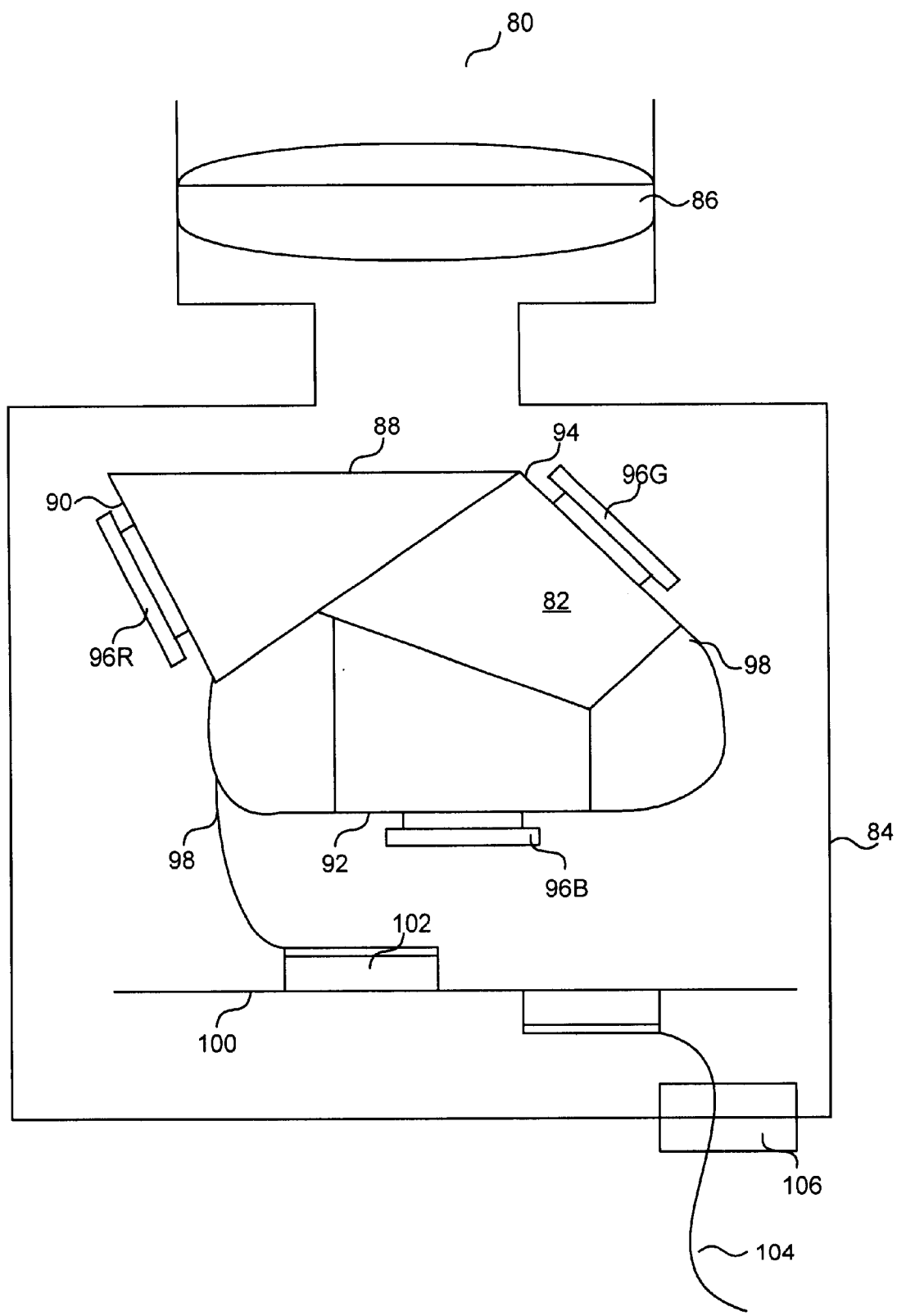
FIG. 5 is a block diagram of a digital camera according to the present invention employing an array of double-slope MOS active pixel sensors.

FIG. 3 is a timing diagram of voltage vs. time showing the timing and levels of the signals used to drive an array of pixel sensors according to the present invention to capture a single image in the array. The traces of FIG. 5 are representing positive voltages, wherein higher levels represent more positive voltages.

The first trace represents the RESET signal. The inactive level of the RESET signal shown at reference numeral 40 is set at the overflow barrier level. The active level of the RESET signal shown at reference numeral 42 is set at a level at least a threshold above Vref Large, the more positive of the two reference voltages.

The second trace of FIG. 3 represents the SFD signal. The inactive level of the SFD signal is shown at reference numeral 44 and, in an exemplary embodiment, is set at a level of 0.1 volts. The SFD signal is activated after the end of the integration period. The active level of the SFD signal is shown at reference numeral 46 and, in an exemplary embodiment, is set at a level of 3.0 volts.

The third trace of FIG. 3 represents the ROW SELECT signal. The inactive level of the ROW SELECT signal is shown at reference numeral 44 and, in an exemplary embodiment, is set at a level of about zero volts. The ROW SELECT signal is activated after the end of the integration period during the time when the SFD signal is activated. The active level of the ROW SELECT signal is shown at reference numeral 46 and, in an exemplary embodiment, is set at a level of about +3 volts. As shown at reference numeral 52, a timing constraint for the SFD and ROW SELECT signals is that the ROW SELECT signal level must drop to its inactive level 48 before the SFD signal drops below its active level 44 in order to avoid disturbing the charge on the column output line.

In a typical application of the double-slope MOS pixel sensor of the present invention, a plurality of such pixel sensors will be disposed in an array. As would be expected by persons of ordinary skill in the art, common RESET, Vref Large, Vref Small, and SFD lines might be provided for all of the pixel sensors in the array. The source of each N-Channel MOS Row Select transistor (28 in FIG. 1A and 28A and 28B in FIG. 1B) for each pixel sensor in a column of the array will be coupled to a column line associated with that column and the gate of the N-Channel MOS Row Select transistor (28 in FIG. 1A and 28A and 28B in FIG. 1B) for each pixel sensor in a row of the array will be coupled to a ROW SELECT line associated with that row. If SFD is to be pulsed, it may be advantageous to provide separate lines for each row so that SFD is pulsed only for pixels in the selected row. If a scrolling electronic shutter function is desired, the RESET signals may be supplied on separate lines for each row to start the exposure for each row a fixed interval before the readout time, so that all of the rows can still have equal exposure durations, as is well known in the art.

Figure 4:
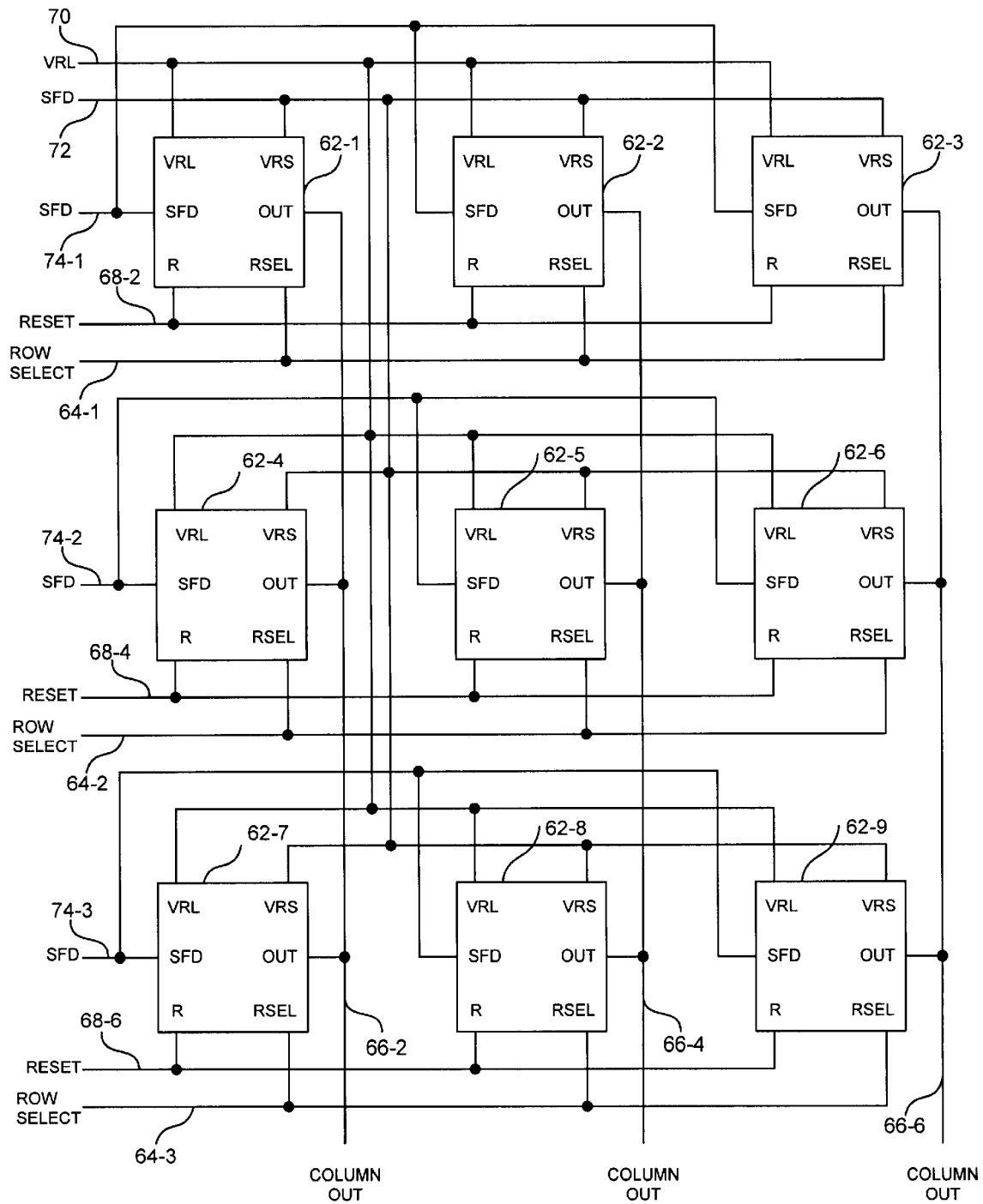
FIG. 4 is a block diagram of a 3 by 3 portion of an illustrative array of double-slope MOS active pixel sensors according to the present invention.

Referring now to FIG. 4, a block diagram of 3 by 3 portion 60 of an illustrative array of double-slope MOS active pixel sensors according to the present invention is presented. Persons of ordinary skill in the art will appreciate that the 3 by 3 portion of the array depicted in FIG. 4 is merely illustrative and that arrays of arbitrary size may be fabricated according to the principles of the present invention.

The 3 by 3 portion 60 of the array in FIG. 4 includes three rows and three columns of double-slope MOS active pixel sensors according to the present invention. A first row includes double-slope MOS active pixel sensors 62-1, 62-2, and 62-3; a second row includes double-slope MOS active pixel sensors 62-4, 62-5, and 62-6; a third row includes double-slope MOS active pixel sensors 62-7, 62-8, and 62-9. A first column includes double-slope MOS active pixel sensors 62-1, 62-4, and 62-7; a second column includes double-slope MOS active pixel sensors 62-2, 62-5, and 62-9; a third column includes double-slope MOS active pixel sensors 62-3, 62-6, and 62-9.

A first ROW SELECT line 64-1 is connected to the row-select inputs (RSEL) of double-slope MOS active pixel sensors 62-1, 62-2, and 62-3. A second ROW SELECT line 64-2 is connected to the row-select inputs (RSEL) of double-slope MOS active pixel sensors 62-4, 62-5, and 62-6. A third ROW SELECT line 64-3 is connected to the row-select inputs (RSEL) of double-slope MOS active pixel sensors 62-7, 62-8, and 62-9.

A first COLUMN OUTPUT line 66-1 is connected to the outputs (OUT) of double-slope MOS active pixel sensors 62-1, 62-4, and 62-7. A second COLUMN OUTPUT line 6

6-2 is connected to the outputs (OUT) of double-slope MOS active pixel sensors 62-2, 62-5, and 62-9. A third COLUMN OUTPUT line 66-3 is connected to the outputs (OUT) of double-slope MOS active pixel sensors 62-3, 62-6, and 62-9.

A first RESET line 68-1 is connected to the reset (R) inputs of all of the double-slope MOS active pixel sensors 62-1 through 62-3 in the first row of the array. A second RESET line 68-2 is connected to the reset (R) inputs of all of the double-slope MOS active pixel sensors 62-3 through 62-6 in the second row of the array. A third RESET line 68-3 is connected to the reset (R) inputs of all of the double-slope MOS active pixel sensors 62-7 through 62-9 in the third row of the array. A global Vref Large line 70 is connected to the Vref Large (VRL) inputs of all of the double-slope MOS active pixel sensors 62-1 through 62-9. A global Vref Small line 72 is connected to the Vref Small (VRS) inputs of all of the double-slope MOS active pixel sensors 62-1 through 62-9. A first SFD line 74-1 is connected to the SFD inputs of all of the double-slope MOS active pixel sensors 62-1 through 62-3 in the first row of the array. A second SFD line 74-2 is connected to the SFD inputs of all of the double-slope MOS active pixel sensors 62-3 through 62-6 in the second row of the array. A third SFD line 74-3 is connected to the SFD inputs of all of the double-slope MOS active pixel sensors 62-7 through 62-9 in the third row of the array.

When the array including 3 by 3 portion 60 is driven by the signals shown in FIG. 4, images may be captured. One particular application of such an array is in a digital camera.

Referring now to FIG. 5, a block diagram of an illustrative digital camera 80 employing an array of double-slope MOS active pixel sensors according to the present invention is presented in schematic form. A color-separating prism 82 is shown mounted inside light-tight housing 84. Lens 86 is fitted to the housing in such a manner that it projects through the input face 88 of the prism 82, an image which is thereby split into red, green, and blue images, which are each focussed on one of output faces 90, 92, and 94 of prism 82.

Attached to the three output faces of prism 82 are three chip-on-board assemblies, labeled 96R, 96G, and 96B, aligned in such a way that the color-separated images fall on their active areas in registration. Each chip-on-board assembly includes an imaging array of pixel sensors like that partially depicted in FIG. 5 according to the present invention. Each of these assemblies is attached to its respective prism face. One method for attaching these assemblies to the prism faces is disclosed in co-pending application Ser. No. 09/302,565, filed Apr. 30, 1999, expressly incorporated herein by reference.

Signal connections to the chip-on-board assemblies 96R, 96G, and 96B are made by way of a ribbon cable 98 which is fitted with three connectors that mate with connectors on the 3 chip-on-board assemblies. In addition, ribbon cable 98 is attached to a circuit board 100 by way of connector 102. Circuit board 100 comprises the support electronics for controlling the reading of image data from the three imaging arrays on the chip-on-board assemblies 96R, 96G, and 96B mounted on the prism 82 as is understood by those skilled in the art. Cable 104 carries power into light-tight housing 84, and carries out of the light-tight housing 84 signals representative of the image captured through lens 86. Cable 104 exits light-tight housing 84 through light-tight fixture 106.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An active pixel sensor disposed on a semiconductor substrate comprising:
    a first photodiode having a first terminal coupled to a fixed potential and a second terminal, said first photodiode having a first size;
    a second photodiode having a first terminal coupled to a fixed potential and a second terminal, said second photodiode having a second size smaller than said first size;
    a first semiconductor reset switch having a first terminal coupled to said second terminal of said first photodiode and a second terminal coupled to a first reset potential that reverse biases said first photodiode;
    a second semiconductor reset switch having a first terminal coupled to said second terminal of said second photodiode and a second terminal coupled to a second reset potential that reverse biases said second photodiode;
    a first semiconductor source-follower amplifier having an input coupled to said second terminal of said first photodiode and an output;
    a second semiconductor source-follower amplifier having an input coupled to said second terminal of said second photodiode and an output coupled to the output of said first semiconductor source-follower amplifier;
    said first and second semiconductor reset switches each having a control element coupled to a control circuit for selectively activating said first and second semiconductor reset switches.

2. The double-slope MOS active pixel sensor of claim 1 further including a semiconductor readout select switch coupled between the outputs of said first and second semiconductor source-follower amplifiers and a readout line, said semiconductor readout select switch having a control element coupled to said control circuit.

3. A double-slope MOS active pixel sensor disposed on a semiconductor substrate comprising:
    a first photodiode having a first terminal coupled to a fixed potential and a second terminal, said first photodiode having a first size;
    a second photodiode having a first terminal coupled to a fixed potential and a second terminal, said second photodiode having a second size smaller than said first size;
    a first semiconductor reset switch having a first terminal coupled to said second terminal of said first photodiode and a second terminal coupled to a first reset potential that reverse biases said first photodiode;
    a second semiconductor reset switch having a first terminal coupled to said second terminal of said second photodiode and a second terminal coupled to a second reset potential that reverse biases said second photodiode;
    a first semiconductor source-follower amplifier having an input coupled to said second terminal of said first photodiode and an output;
    a second semiconductor source-follower amplifier having an input coupled to said second terminal of said second photodiode and an output;
    a first semiconductor readout select switch having an input coupled to the output of said first semiconductor source-follower amplifier and an output coupled to a readout line;

a second semiconductor readout select switch having an input coupled to the output of said second semiconductor source-follower amplifier and an output coupled to said readout line said first and second semiconductor reset switches and said first and second semiconductor readout select switches each having a control element coupled to a control circuit for selectively activating said first and second semiconductor reset switches and said first and second semiconductor readout select switches.

4. A double-slope MOS active pixel sensor disposed on a semiconductor substrate comprising:

a first photodiode having a first terminal coupled to a fixed potential and a second terminal, said first photodiode having a first size;

a second photodiode having a first terminal coupled to a fixed potential and a second terminal, said second photodiode having a second size smaller than said first size;

a first MOS reset transistor having a source coupled to said second terminal of said first photodiode, a drain coupled to a first reset potential that reverse biases said first photodiode, and a gate coupled to a source of a RESET signal;

a second MOS reset transistor having a source coupled to said second terminal of said second photodiode, a drain coupled to a second reset potential that reverse biases said second photodiode, and a gate coupled to said source of a RESET signal;

a first MOS source-follower transistor having a gate coupled to said second terminal of said first photodiode, a drain coupled to a drain node and a source;

a second MOS source-follower transistor having a gate coupled to said second terminal of said second photodiode, a drain coupled to said drain node and a source coupled to said source of said first MOS source-follower transistor;

said RESET signal and said drain node coupled to a control circuit for selectively activating said first and second MOS reset transistors and said first and second MOS source-follower transistors.

5. The double-slope MOS active pixel sensor of claim 4 further including a MOS readout select transistor coupled between the sources of said first and second N-Channel MOS source-follower transistors and a readout line, said MOS readout select transistor having a gate coupled to said control circuit via a ROW SELECT line.

* * * * *